US007111849B2

(12) United States Patent
Yun

(10) Patent No.: US 7,111,849 B2
(45) Date of Patent: Sep. 26, 2006

(54) ACTUATOR ASSEMBLY FOR A SUSPENSION

(75) Inventor: Seok-Chan Yun, Seoul (KR)

(73) Assignee: Hyundai Mobis Co., Ltd., Yongin-shi (KR)

(*) Notice: Subject to any disclaimer, the term of this patent is extended or adjusted under 35 U.S.C. 154(b) by 266 days.

(21) Appl. No.: 10/748,245

(22) Filed: Dec. 31, 2003

(65) Prior Publication Data

US 2005/0098975 A1    May 12, 2005

(30) Foreign Application Priority Data

Nov. 11, 2003   (KR) ...................... 10-2003-0079343

(51) Int. Cl.
*B60G 17/016*   (2006.01)
(52) U.S. Cl. ............... 280/5.52; 280/5.521; 280/5.522; 280/86.751; 280/86.758
(58) Field of Classification Search ......... 280/124.127, 280/124.109, 124.112, 124.153, 5.52, 5.521, 280/5.522, 86.751; 267/189, 86.757, 86.75
See application file for complete search history.

(56) References Cited

U.S. PATENT DOCUMENTS 2,792,216 A * 5/1957 Janeway .................... 267/189
4,470,611 A * 9/1984 Duphily et al. ............. 280/104
5,108,126 A * 4/1992 Banse .................... 280/86.757
5,954,352 A * 9/1999 Rumpel et al. ........ 280/124.134
6,073,946 A * 6/2000 Richardson ................ 280/86.5
6,182,979 B1 * 2/2001 Lee .......................... 280/5.507
6,357,543 B1 * 3/2002 Karpik ....................... 180/182

FOREIGN PATENT DOCUMENTS

KR    2003-0017668    3/2003

* cited by examiner

Primary Examiner—Paul N. Dickson
Assistant Examiner—Tiffany L. Webb
(74) Attorney, Agent, or Firm—Greenblum & Bernstein, P.L.C.

(57) ABSTRACT

An actuator assembly for a suspension is provided, in which a hinge unit is formed on an actuator and the actuator can be rotated according to a forward or backward movement of a rod, and thereby it is possible to prevent sliding at the joint of the lever and the actuator, thus to secure durability of the system.

9 Claims, 5 Drawing Sheets

[FIG. 1] PRIOR ART
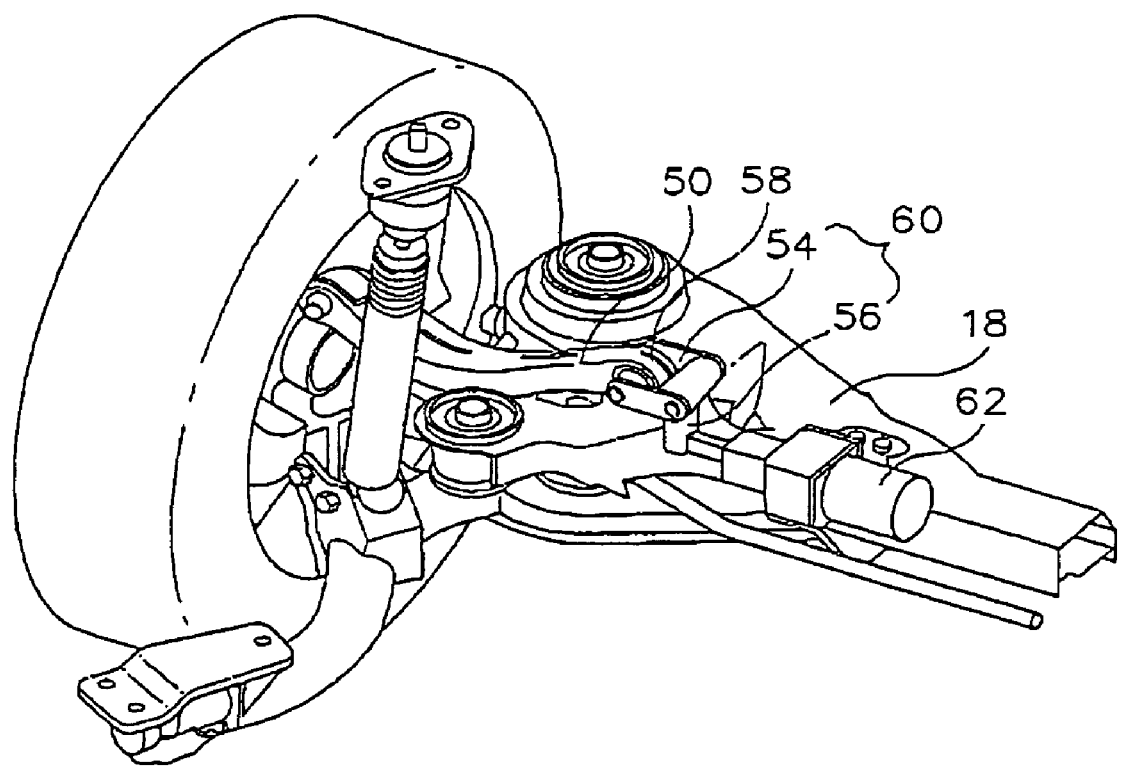

FIG. 2   PRIOR ART
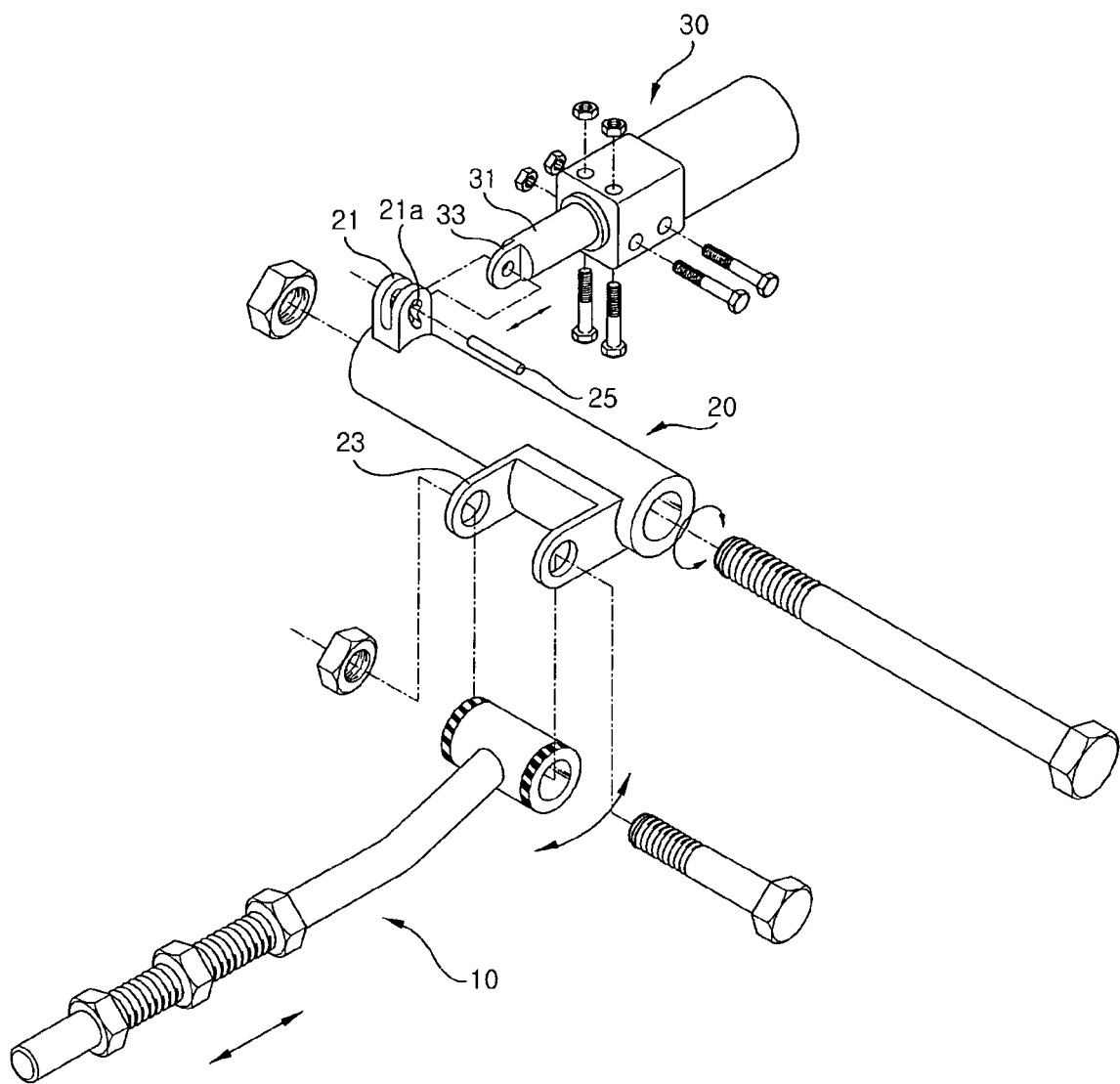

FIG. 3 PRIOR ART
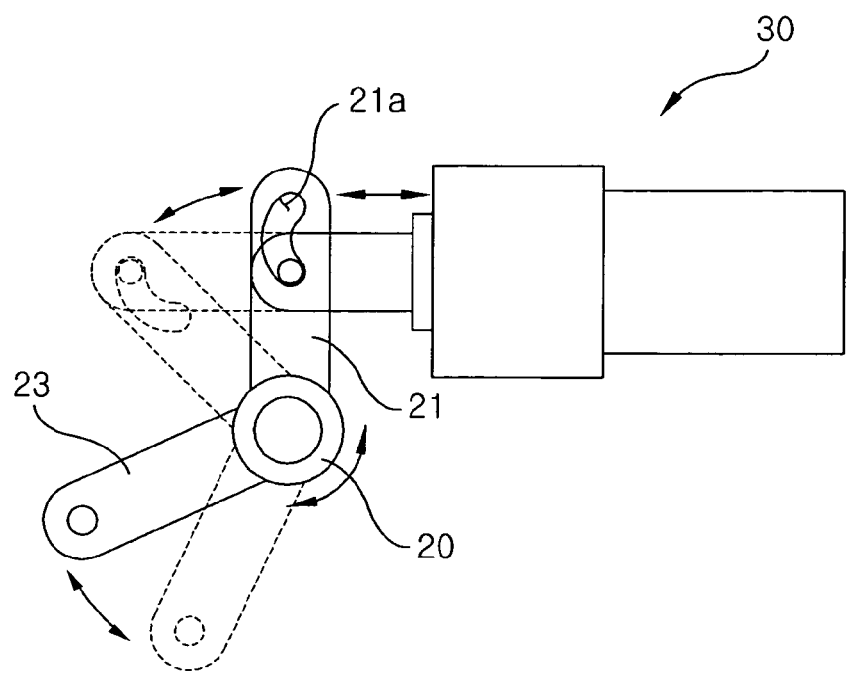
FIG. 4
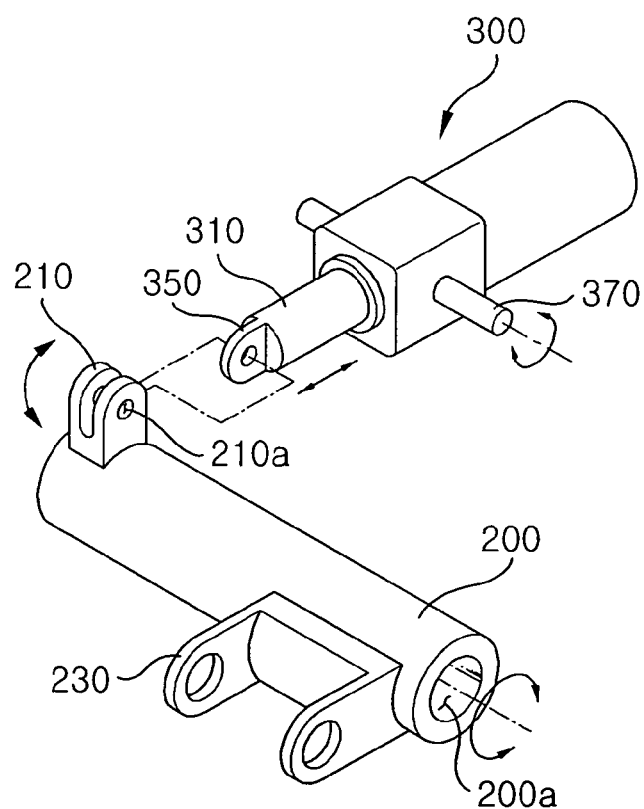

US 7,111,849 B2

ACTUATOR ASSEMBLY FOR A SUSPENSION

RELATED APPLICATIONS

The present disclosure relates to subject matter contained in priority Korean Application No. 10-2003-0079343, filed on Nov. 11, 2003, which is herein expressly incorporated by reference in its entirety.

BACKGROUND OF THE INVENTION

1. Field of the Invention

The present invention relates to an actuator assembly for a suspension, and more particularly to an actuator assembly for a suspension, in which a hinge unit is formed on an actuator and the actuator can be rotated according to a forward or backward movement of a rod.

2. Description of the Related Art

In general, a suspension must satisfy fundamental requirements for securing manipulation capability and stability of the vehicle during turning and braking of the vehicle. To satisfy these requirements, a posture of wheels caused by a suspension geometry acts as a very important element. Particularly, a camber and a tow have much influence on linear traveling and turning stability of the vehicle, which is closely involved with rolling of a vehicle body.

An actuator assembly for a suspension capable of properly changing these camber and tow according driving requirements of the vehicle is disclosed in Korean Patent Publication No. 2003-0017668.

FIG. 1 is a perspective view illustrating a conventional actuator assembly for a suspension. As shown in FIG. 1, the actuator assembly is connected with an upper control arm 50, and comprises a joint link 60 consisting of a horizontal part 54 and a vertical part 56, the middle portion thereof being hinged to a sub frame 18, one end of the horizontal part 54 being hinged with a body-side joint end 58 of the upper control arm 50, and an actuator 62 coupled with one end of the vertical part 56 of the joint link 69. When the vertical part 56 of the joint link 60 is pulled by rotation operation of the actuator 62, one end of the horizontal part 54 is descended to pull the body-side joint end 58 of the upper control arm 50, so that the camber is changed while an upper portion of the wheel is slanted toward the body.

FIGS. 2 and 3 illustrate the embodiment for carrying out the prior art.

FIG. 2 is an exploded perspective view showing the embodiment of FIG. 1, and FIG. 3 is an operational view of FIG. 2. As shown FIGS. 2 and 3, a lever 20 hinged to a sub frame is provided with first and second brackets 21 and 23. The second bracket 23 is coupled to an auxiliary link 10, which is mounted to a control arm or a knuckle. The second bracket 23 is formed with a slot 21a. A mount 33 of an actuator rod 31 is mounted to the second bracket 23 and fixed by a pin 25. For the actuator assembly constructed in this manner, as shown in FIG. 3, the lever 20, the auxiliary link 10 etc. which are coupled with the actuator 30 move according to forward and backward operation of the actuator rod 31. Thereby, a tow of the rear wheels is regulated.

However, the foregoing actuator assembly has the following disadvantages.

The actuator 30 moves forward or backward with its rod 31 fixed to the body. The lever 20 coupled with the rod 31 by the pin 25 is hinged to rotate. Here, the pin 25 essentially slides in the slot 21a, which has severe influence on durability of the entire system.

SUMMARY OF THE INVENTION

To solve the above-indicated problems, it is, therefore, an object of the present invention to provide an actuator assembly of a suspension, capable of preventing sliding at the joint of the lever and the actuator and thus securing durability of the system.

It is another object of the present invention to provide an actuator assembly of a suspension, capable of relieving stress concentration to enhance durability.

To achieve the above object, there is provided an actuator assembly of a suspension, including a lever provided with first and second brackets and hinged to a sub frame, an actuator coupled to the first bracket on one end thereof, and a movable member permitting pivoting of the actuator.

Here, it is preferable that the movable member is a hinge unit mounted on the actuator.

With this construction, the actuator can absorb sliding of the joint without using a slot or a pin joint, so that it is possible to prevent sliding at the joint of the lever and the actuator.

Further, the first bracket has an insert hole which takes a circular shape, so that it is possible to relieve stress concentration to enhance durability

BRIEF DESCRIPTION OF THE DRAWINGS

The above objects, features and advantages of the present invention will become more apparent from the following detailed description when taken in conjunction with the accompanying drawings, in which:

FIG. 1 is a perspective view illustrating a conventional actuator assembly for a suspension;

FIG. 2 is an exploded perspective view showing the embodiment of FIG. 1;

FIG. 3 is an operational view of FIG. 2;

FIG. 4 is a perspective view illustrating an actuator assembly of a suspension according to a preferred embodiment of the present invention;

DETAILED DESCRIPTION OF THE PREFERRED EMBODIMENT

Figure 5:
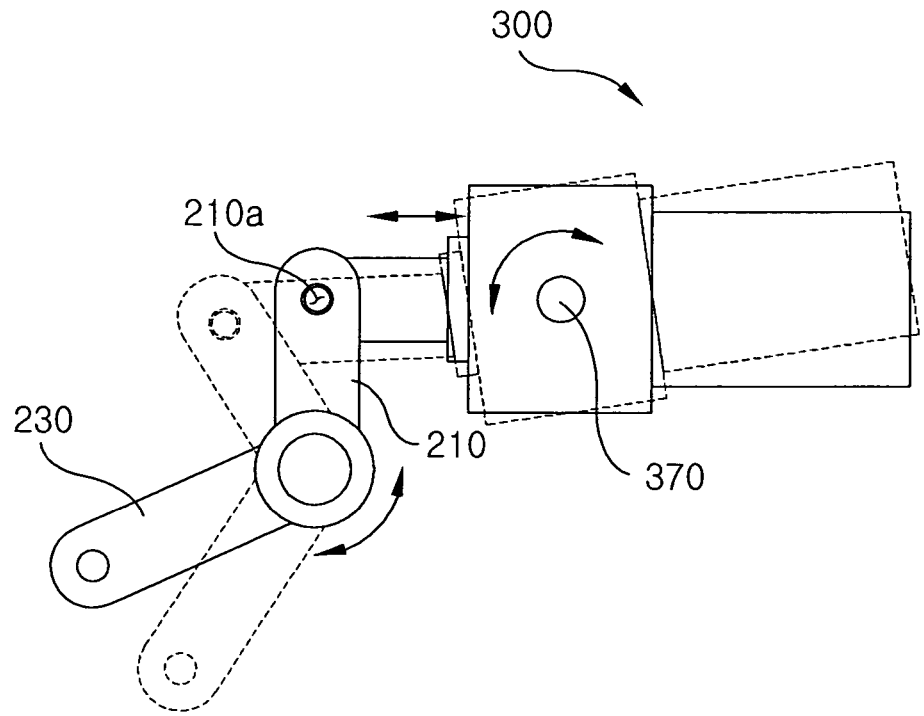
FIG. 5 is an operational view of FIG. 4.

A preferred embodiment of the present invention will now be described with reference to the accompanying drawings. In the following description, same drawing reference numerals are used for the same elements even in different drawings. The matters defined in the description such as a detailed construction are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 6:
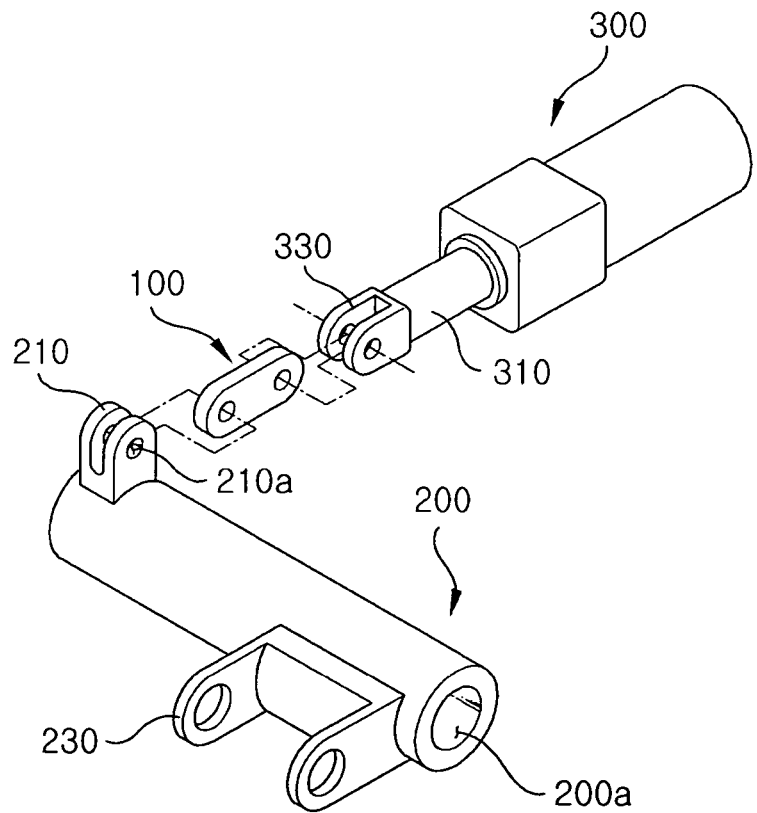
FIG. 6 is a perspective view illustrating an actuator assembly of a suspension according to another preferred embodiment of the present invention.
Figure 7:
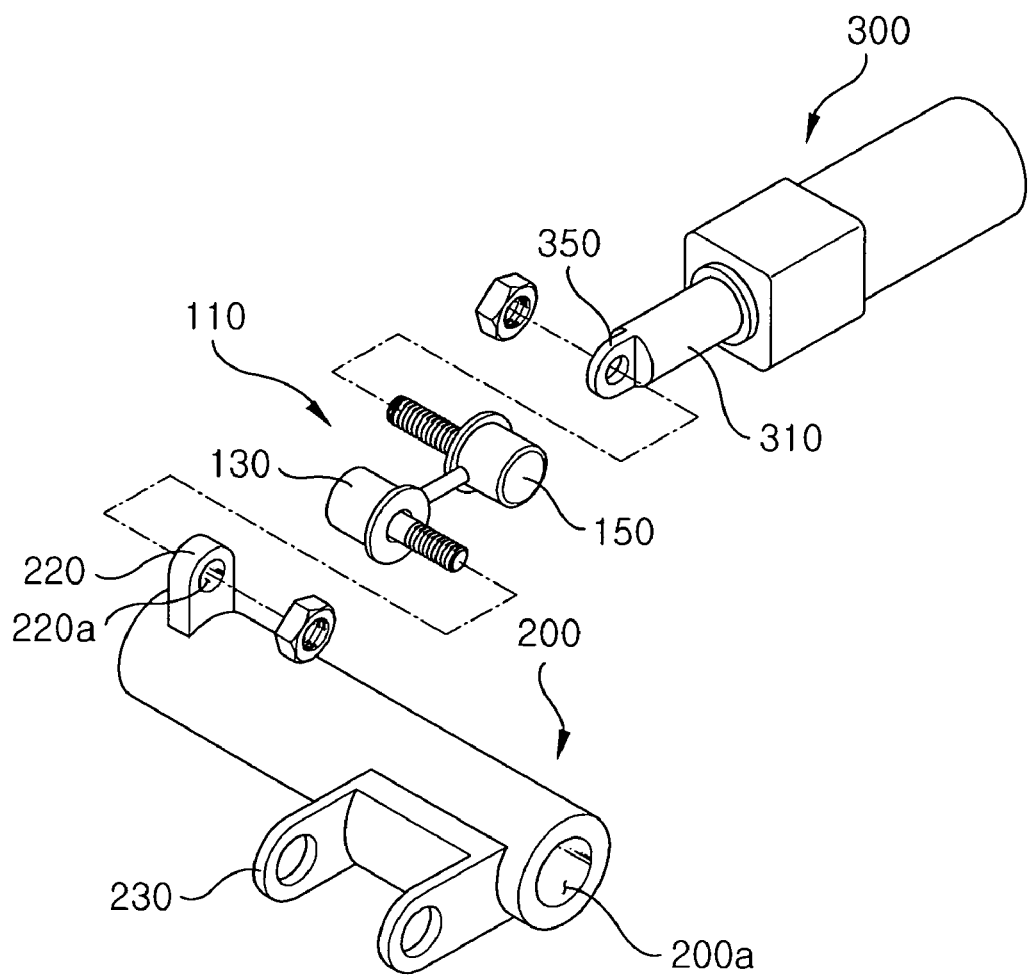
FIG. 7 is a perspective view illustrating an actuator assembly of a suspension according to yet another preferred embodiment of the present invention.
Figure 8:
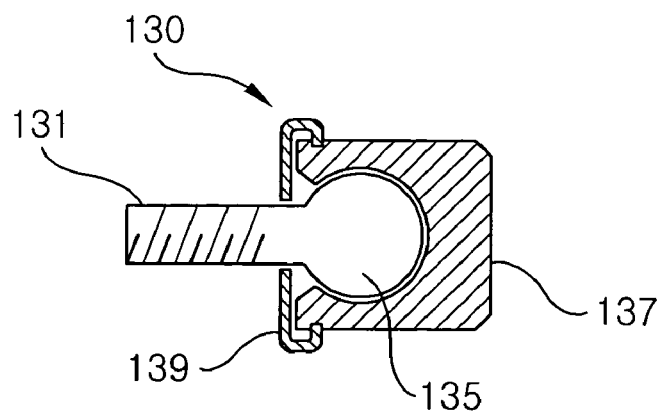
FIG. 8 is a magnified cross-sectional view illustrating the ball joint of FIG. 7.

FIG. 4 is a perspective view illustrating an actuator assembly of a suspension according to a preferred embodiment of the present invention, FIG. 5 is an operational view of FIG. 4, FIG. 6 is a perspective view illustrating an actuator assembly of a suspension according to another preferred embodiment of the present invention, FIG. 7 is a perspective view illustrating an actuator assembly of a suspension according to yet another preferred embodiment of the present invention, and FIG. 8 is a magnified cross-sectional view illustrating the ball joint of FIG. 7.

As shown in FIG. 4, an actuator assembly of a suspension of the present embodiment includes a lever 200 provided with first and second brackets 210 and 230, an actuator 300 coupled with the first bracket 210 on one end thereof, and a movable member permitting pivoting of the actuator 300.

The lever 200 has a through hole 200a formed in the middle thereof. A fastener is inserted into the through hole 200a, which is hinged to a sub frame (not shown).

As shown in FIG. 4, the first bracket 210 is formed in a direction vertical to the lever 200, and the second bracket 230 is formed in a horizontal direction.

Even though the first bracket 210 is shown in the vertical direction in FIG. 4 and the second bracket 230 in the horizontal direction, in the case where the actuator is located under the lever as in the prior art of FIG. 1, the first bracket 210 may be formed in the horizontal direction and the second bracket 230 in the vertical direction.

The second bracket 230 is coupled with an auxiliary link (not shown), which is mounted to a control arm or a knuckle (not shown).

Meanwhile, as in the prior art of FIG. 1, the control arm or the knuckle may be directly connected to the second bracket 230.

The first bracket 210 is provided with a circular insert hole 210a.

A mount 350 formed on the actuator rod 310 is inserted into the first bracket 210.

Then, a fastener (not shown) is fastened to the insert hole 210a of the first bracket 210, so that the first bracket 210 is coupled with the actuator 300.

The actuator 300 is controlled by an electronic control unit (ECU).

According to the first embodiment of the present invention, the movable member is a hinge unit 370, which is mounted on the actuator 300.

In other words, the hinge unit 370 is provided on an outer circumferential surface of the actuator 300.

The actuator 300 is rotatably mounted to a body such as the sub frame by the hinge unit 370.

Hereinafter, an operation of the present embodiment constructed as above will be described.

As the actuator rod 310 travels forward or backward, the actuator 300 pivots about the hinge unit 370, thus the lever 200 coupled with the link 100 also rotates.

In other words, as shown in FIG. 5, as the actuator rod 310 extends, the actuator 300 pivots, and the lever 200 rotates, and the second bracket 230 goes downward to pull the control arm or the knuckle.

To the contrary, as the actuator rod 310 is contracted, the second bracket 230 of the lever 200 is ascended to push the control arm and the knuckle.

In this manner, by the telescopic movement of the actuator rod 310, the actuator 300 and the lever 200 rotate to pull the control arm or the knuckle toward or outward the body, so that the tow or camber is controlled.

As such, by forming the hinge unit 370 on the actuator 300 to pivot the actuator 300 according to the forward or backward movement of the rod 310, the actuator 300 can absorb sliding of the joint without using a slot or a pin joint. As a result, it is possible to prevent sliding at the joint of the lever 200 and the actuator 300.

Furthermore, the sliding does not occur at the joint of the lever 200 and actuator 300, it is possible to secure durability of the system.

Further, the insert hole 210a of the first bracket 210 of the lever 200 is bored in a circular shape, so that stress concentration is relieved to enhance durability.

Another embodiment of the present invention is shown in FIG. 6. As shown in FIG. 6, an actuator assembly of a suspension according to another embodiment of the present invention includes a lever 200 provided with first and second brackets 210 and 230, a link 100 coupled with the first bracket 210 on one end thereof, and an actuator 300 coupled with the other end of the link 100.

Here, the same reference numerals will be given to the same or similar components, and so separate description on the same or similar components will be omitted.

One end of the link 100 is inserted into the first bracket 210, and then a fastener is fastened to an inset hole 210a. As a result, the first bracket 210 is coupled with the link 100.

Meanwhile, the actuator rod 310 is preferably provided with a yoke 330. The yoke 330 is connected with the other end of the link 100 which is coupled with the first bracket 210.

Seeing an operation of the actuator assembly of the suspension constructed like this, as the actuator rod 310 extends, the link 100 rotates. At the same time, the lever 200 rotates, and the second bracket 230 is descended to pull a control arm or a knuckle.

To the contrary, as the actuator rod 310 is contracted, the second bracket 230 of the lever 200 is ascended to push the control arm or the knuckle.

In this manner, by coupling the lever 200 and the actuator 300 in addition to the link 100, it is possible to prevent sliding at the joint of the lever 200 and the actuator 300 without using a slot and a pin joint, and to secure durability of the system.

Further, the insert hole 210a of the first bracket 210 of the lever 200 is bored in a circular shape, so that stress concentration is relieved to enhance durability.

Meanwhile, in the case where the yoke 330 is formed on the actuator rod 310 to coupled with the link 100, it is possible to prevent twisting caused by a moment acting on the link 100 when the link 100 rotates.

Yet another embodiment of the present invention is shown in FIGS. 7 and 8. As shown in FIGS. 7 and 8, an actuator assembly of a suspension according to another embodiment of the present invention includes a lever 200 provided with first and second brackets 220 and 230, a drop link 110 coupled with the first bracket 220 by a first ball joint 130 on one end thereof, and an actuator 300 coupled with a second ball joint 150 of the other end of the drop link 110.

Here, the same reference numerals will be given to the same or similar components, and so separate description on the same or similar components will be omitted.

The ball joint 130 is a structure in which a spherical ball 135 formed on a ball stud 131 is pivotably fitted in a socket 137 as already well-known in the prior art.

A dust cover 139 may be provided in order to prevent foreign matters from being introduced between the ball stud 131 and the socket 137.

Seeing an operation of the actuator assembly of the suspension constructed like this, as the actuator rod 310 extends, each of the ball joints 130 and 150 of the drop link 110 rotates. At the same time, the lever 200 rotates, and the second bracket 230 is descended to pull a control arm or a knuckle.

To the contrary, as the actuator rod 310 is contracted, the second bracket 230 of the lever 200 is ascended to push the control arm or the knuckle.

In this manner, by coupling the lever 200 and the actuator 300 in addition to the drop link 110 on opposite ends of which the ball joints 130 and 150 are formed by the ball joints 130 and 150 of the drop link 110 respectively, it is possible to prevent sliding at the joint of the lever 200 and the actuator 300 without using a slot and a pin joint, and to secure durability of the system.

Further, it is possible twisting accused by a moment acting on the drop link 110 on opposite ends of which the ball joints 130 and 150 are formed when the drop link 10 rotates, thus to prevent performance deterioration.

Further, the insert hole 220*a* of the first bracket 220 of the lever 200 is bored in a circular shape, so that stress concentration is relieved to enhance durability.

While the invention has been shown and described with reference to certain preferred embodiments thereof, it will be understood by those skilled in the art that various changes in form and details may be made therein without departing from the spirit and scope of the invention as defined by the appended claims.

As can be seen from the foregoing, according to the actuator assembly of the suspension of the present invention, there are the following effects.

First, the movable member is mounted on the actuator, so that the actuator can absorb sliding of the joint without using a slot or a pin joint. As a result, it is possible to prevent sliding at the joint of the lever and the actuator.

Furthermore, because the sliding is not generated at the joint of the lever and the actuator, it is possible to secure durability of the system.

Second, the insert hole of the first bracket is bored in a circular shape, so that stress concentration can be relieved to enhance durability.

What is claimed is:

1. An actuator assembly of a suspension, comprising:
   a lever provided with first and second brackets and hingedly connectable to a sub frame;
   an actuator coupled to the first bracket on one end thereof; and
   a movable member provided on an outer circumferential surface of the actuator, such that the actuator pivots about the movable member.

2. The actuator assembly as claimed in claim 1, wherein the movable member is a hinge unit mounted on the actuator.

3. The actuator assembly as claimed in claim 1, wherein the first bracket has an insert hole which is circular in shape.

4. The actuator assembly as claimed in claim 2, wherein the first bracket has an insert hole which is circular in shape.

5. The actuator assembly as claimed in claim 1, wherein the first bracket is provided in one of a horizontal or vertical direction with respect to the lever and the second bracket is provided in the other of the horizontal or vertical direction with respect to the lever.

6. The actuator assembly as claimed in claim 2, wherein the actuator further comprises: an actuator rod that travels forward or backward causing the actuator to pivot about the hinge unit.

7. The actuator assembly as claimed in claim 1, wherein the actuator further comprises: a link coupled with the first bracket at one end and coupled with the actuator at an other end thereof.

8. The actuator assembly as claimed in claim 7, wherein the actuator further comprises: an actuator rod provided with a yoke connected to the other end of the link.

9. The actuator assembly as claimed in claim 1, further comprises: a drop link having first and second ball joints,
   wherein the drop link is coupled to the first bracket by the first ball joint and coupled to the actuator by the second ball joint.

\* \* \* \* \*